United States Patent [19]
Saeki et al.

[11] Patent Number: 5,105,928
[45] Date of Patent: Apr. 21, 1992

[54] MAGNETIC CLUTCH

[75] Inventors: Kiyoshi Saeki, Toyonaka; Toshinori Otsuki, Yawata, both of Japan

[73] Assignee: Matsushita Electric Industrial Co., Ltd., Osaka, Japan

[21] Appl. No.: 586,972

[22] Filed: Sep. 24, 1990

[30] Foreign Application Priority Data

Sep. 26, 1989 [JP] Japan ................... 1-249553

[51] Int. Cl.⁵ ...................... F16D 27/01; H02K 49/10
[52] U.S. Cl. ................ 192/84 PM; 192/58 B; 310/103
[58] Field of Search ............. 192/48.1, 58 B, 84 AA, 192/84 PM; 310/103, 90, 92, 96

[56] References Cited

U.S. PATENT DOCUMENTS

| | | | |
|---|---|---|---|
| 2,612,248 | 9/1952 | Feiertag | 192/84 PM |
| 3,470,406 | 9/1969 | Law | 310/103 X |
| 3,636,277 | 1/1972 | Pöhler | 310/103 X |
| 4,050,559 | 9/1977 | Andrews et al. | 192/58 B |
| 4,157,748 | 6/1979 | Beaujean | 192/58 B |
| 4,445,058 | 4/1984 | Janson | 310/103 |
| 4,856,631 | 8/1989 | Okamoto et al. | 192/84 PM |

FOREIGN PATENT DOCUMENTS

| | | | |
|---|---|---|---|
| 2460171 | 12/1975 | Fed. Rep. of Germany | 310/103 |
| 2821973 | 11/1978 | Fed. Rep. of Germany | 310/103 |

Primary Examiner—Allan D. Herrmann
Assistant Examiner—Julie A. Krolikowski
Attorney, Agent, or Firm—Wenderoth, Lind & Ponack

[57] ABSTRACT

A magnetic clutch has a driving-side rotating member for holding one of a magnetic substance member and a hysteresis member and rotating in asynchronization with a rotary shaft; a driven-side rotating member for holding the other of the magnetic substance member and the hysteresis member and rotating in synchronization with the shaft, the driven-side and driving-side rotating members being spaced apart on the shaft; and a device for regulating the rotation of the shaft with sliding friction caused by viscosity. Alternatively, the driving-side rotating member can rotate in synchronization with a rotary shaft, and the driven-side rotating member can rotate in asynchronization with the shaft.

6 Claims, 3 Drawing Sheets

MAGNETIC CLUTCH

BACKGROUND OF THE INVENTION

The present invention relates to a magnetic clutch to be interposed between winding and rewinding members and a driving source in a device for winding and rewinding a wire or other material such as tape or paper.

Generally, any tension may be exerted on a wire or a medium such as tape or paper during the winding and rewinding of the same. In order to prevent the wire or the medium from braking under high tension and to prevent any overload from being applied to a driving source as the tension changes owing to changes in the radius of the wound or unwound winding, a magnetic clutch is arranged between the winding and rewinding members and the source.

A conventional magnetic clutch is shown in FIGS. 6 and 7. In FIG. 6, reference numeral 21 denotes a rotary shaft, 23 a hysteresis member, 22 a driven-side housing for holding the hysteresis member 23 and fixed to the shaft 21, 24 a magnetic substance member, 25 a driving-side housing for holding the magnetic substance member 24, 26 a bearing for separating the rotating operations of the driving-side housing 25 and the shaft 21, and 28 a spacer for maintaining a gap between the hysteresis member 23 and the magnetic substance member 24.

When the rotary power is transmitted from a driving source (not shown) to a pulley 27 integrated with the driving-side housing 25, the transfer torque $T_0$ is applied from the driving-side housing 25 to the driven-side housing 22. The transfer torque $T_0$ is determined by the material and volume of the hysteresis member 23 and of the magnetic substance member 24 and by the distance of the gap therebetween. As shown in FIG. 7, the torque is constant, independent of the number of relative revolutions (n).

In the above structure, however, since the transfer torque is normally constant during the winding operation shown in FIG. 2, for example, the winding tension is large during the initial period of the operation because of the smaller radius of the winding, while the winding tension is small during the final period thereof because of the bigger radius of the winding. In this case, when the wire or the medium such as tape or paper is wound, a very large compressive force is applied in the radial direction to the initially wound part of the wire or the medium of the winding because of the tightening phenomenon, resulting in possible damage to the wire or the medium. On the other hand, the finally wound part of the wire or the medium of the winding is non-uniform because of the starring phenomenon. The starring phenomenon is a known phenomenon in which wrinkles are produced at the outer portion of the winding owing to the relatively low tension under which that part of the wire or medium has been wound to form the outer portion of the winding.

SUMMARY OF THE INVENTION

Accordingly, an essential object of the present invention is to provide a magnetic clutch having a simple structure and capable of imparting a approximately constant tension to a wire or a medium during the winding or rewinding thereof.

In accomplishing these and other objects, according to one aspect of the present invention, there is provided a magnetic clutch comprising: a driving-side rotating member for holding one of a magnetic substance member and a hysteresis member and rotating in asynchronization with a rotary shaft; a driven-side rotating member for holding the other of the magnetic substance member and the hysteresis member and rotating in synchronization with the shaft, the driven-side and driving-side rotating members being spaced apart on the shaft; and means for regulating the rotation of the shaft with sliding friction caused by viscosity.

According to another aspect of the present invention, there is provided a magnetic clutch comprising: a driving-side rotating member for holding one of a magnetic substance member and a hysteresis member and rotating in synchronization with a rotary shaft; a driven-side rotating member for holding the other of the magnetic substance member and the hysteresis member and rotating in asynchronization with the shaft, the driven-side and driving-side rotating members being spaced apart on the shaft; and means for regulating the rotation of the shaft with sliding friction caused by viscosity.

In the above aspects of the present invention, the magnetic substance member and the hysteresis member are spaced apart on the same shaft. And the means for regulating the rotation of the shaft with the sliding friction caused by the viscosity are provided on the driven-side rotating member. As a result thereof, it is possible to impart an approximately constant tension to a wire or a medium such as paper or tape during the winding or rewinding thereof, with the result that the winding or rewinding operations can be performed without any radial compression and non-uniformity being produced in the resulting winding.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE EMBODIMENTS

Figure 1:
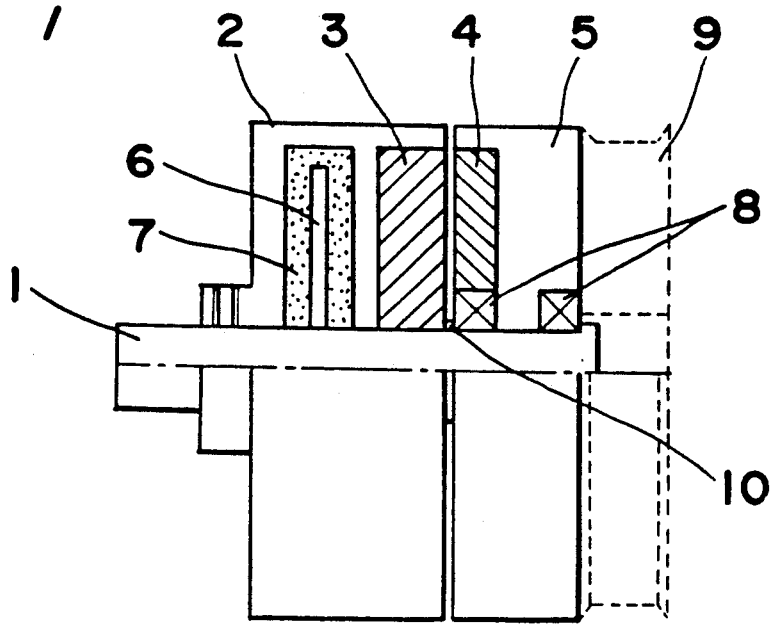
FIG. 1 is a partial cross-sectional view of a magnetic clutch according to a first embodiment of the present invention.

Before the description of the present invention proceeds, it is to be noted that like parts are designated by like reference numerals throughout the accompanying drawings.

Figure 2:
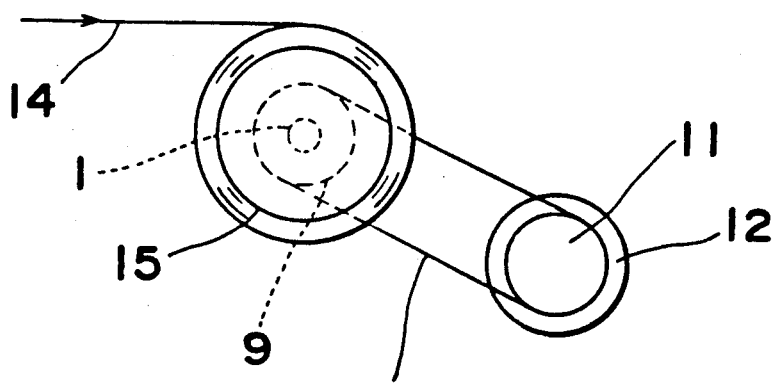
FIG. 2 is a view showing the winding and rewinding of a wire or a medium.
Figure 3:
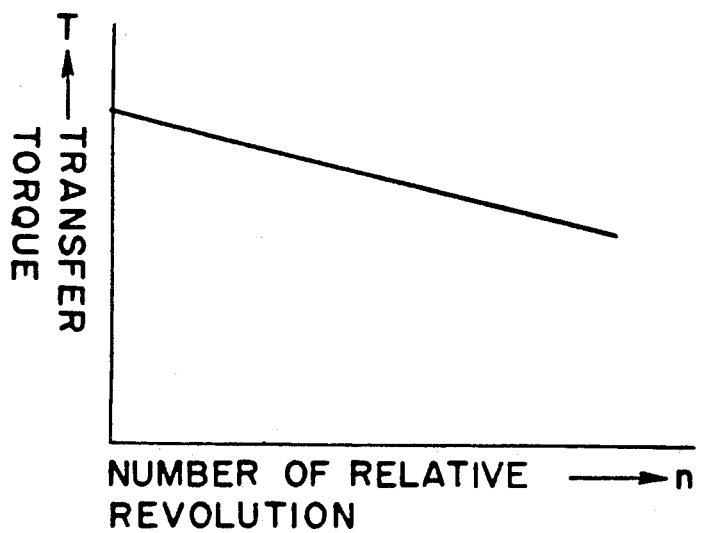
FIG. 3 is a characteristic diagram of the positional torque of the magnetic clutch.

FIG. 1 is a partial cross-sectional view of a magnetic clutch according to a first embodiment of the present invention. In FIG. 1, reference numeral 1 denotes a rotary shaft, 3 a hysteresis member, 2 a driven-side rotating member for holding the hysteresis member 3 and rotating in synchronization with the shaft 1, 4 a magnetic substance member, 5 a driving-side member for holding the magnetic substance member 4 and rotating in asynchronization with the shaft 1, 8 bearings for separating the rotating operations of the driving-side rotating member 5 and the shaft 1, 10 a spacer for maintaining a gap between the hysteresis member 3 and the magnetic substance member 4, 6 a rotary plate fixed to the shaft 1, 7 a viscous medium such as silicone oil, and 9 a pulley fixed to the driving-side rotating member 5. In FIG. 2, reference numeral 12 denotes a driving source, 11 a pulley arranged on a rotary shaft of the source 12, 13 a belt extending between the pulleys 9 and 11, 15 a reel for synchronously rotating with the shaft 1, and 14 a wire or a material such paper or tape to be wound on the reel 15.

The operation of the magnetic clutch having the above structure will be described hereinafter referring to FIGS. 1-4.

The rotary power from the source 12 is transmitted to the pulley 9 through the pulley 11 and the belt 13. The pulley 9 is fixed on the driving-side rotating member 5 supported by the bearings 8. Then, the rotary power from the source 12 allows the driving-side rotating member 5 to rotate in asynchronization with the rotation of the shaft 1. The number of revolutions of the driving-side rotating member 5 is a constant value capable of winding the wire or the medium 14 travelling at a constant speed without causing slack even though the reel 15 defines the minimum winding radius.

The hysteresis member 3 and the magnetic substance member 4 are opposed to each other on the shaft 1 at the gap corresponding to the thickness of the spacer 10. The hysteresis coupling function is accomplished with the arrangement of the hysteresis member 3 and the magnetic substance member 4. The function of the hysteresis coupling is described hereinafter. When an alternating field is applied to a ferromagnetic substance such as iron or a permanent magnet hysteresis loss is observed. That is, a hysteresis curve representative of such a case can be drawn, and the area under the hysteresis curve corresponds to heat energy consumed as hysteresis loss. The heat energy is produced by the hysteresis phenomenon caused by the work necessary to change the magnetic field. An isotropic magnet made of iron, cobalt, and nickel is used as the hysteresis member 3, and a wet-type aeolotropic magnet made of iron is used as the magnetic substance member 4.

The transfer torque $T_0$ between the hysteresis member 3 and the magnetic substance member 4 is represennted by the following equation:

$$T_0 = (P/4\pi) \cdot V \cdot Eh,$$

wherein P denotes the number of magnetic poles of the magnet, V denotes the volume of the hysteresis member, and Eh denotes the hysteresis loss per unit volume. A constant transfer torque independent of the relative number of revolutions is thus generated between the hysteresis member 3 and the magnetic substance member 4.

Assuming that the reel 15, which has the radius (r), winds the wire or the medium 14 at a constant speed (v), the angular velocity ($\omega$) of the shaft 1 is ($v/2\pi r$). If the coefficient of viscosity of the viscous medium 7 is ($\mu$), the torque T' applied to the rotary plate 6 fixed to the shaft 1 is ($\mu \cdot \omega$) when winding at the angular velocity ($\omega$). Since the driven-side rotating member 2 is fixed to the shaft 1, the torque T' is applied to the driven-side rotating member 2 in a negative direction. Since the transfer torque $T_0$ is applied from the driving-side rotating member 5 to the driven-side rotating member 2, when the radius of the winding of the wire or the medium 14 on the reel 15 is (r), a transfer torque T ($=T_0-T'$) applied thereto is affected by the resistance offered by the viscous medium 7. Therefore, when the radius of the winding of the wire or the medium 14 is (r), the tension (S) exerted on the wire or the medium 14 is represented by the following equation:

$$S = T/r = (T_0 - T')/r = T_0/r - \mu v/2\pi r^2.$$

Figure 4:
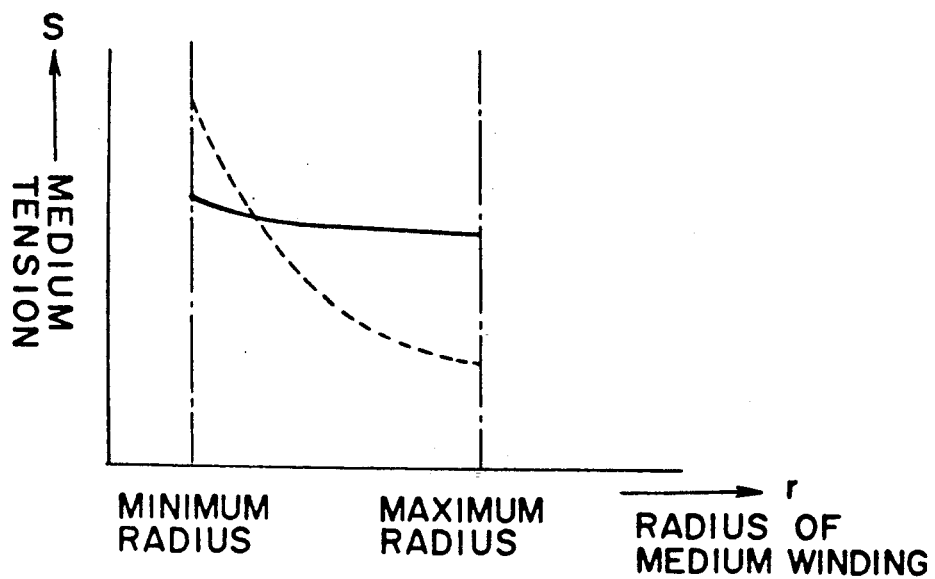
FIG. 4 is a graph of the relation between the tension and the winding radius of a reel when using the magnetic clutch.

A viscous medium 7 exhibiting a value ($\mu$), corresponding to the viscosity of the viscous medium 7, is so selected that the difference between the tensions generated when the maximum and minimum radii of the winding occur, as shown by the solid curve line in FIG. 4, is remarkably smaller than that between the tensions generated when the maximum and minimum radii of the winding in the conventional apparatus occur, as shown by the dotted line in FIG. 4.

The space 10 can be occupied by a coil-shaped spring so that the position at which the driven-side rotating member 2 is fixed with respect to the shaft 1 can be changed. Thus, since the value of the transfer torque $T_0$ between the hysteresis member 3 and the magnetic substance member 4 is changeable, any curves with various levels such as the solid line in FIG. 4 can be obtained.

As described above, in the first embodiment, the hysteresis member 3 rotating in synchronization with the shaft 1 and the magnetic substance member 4 rotating in asynchronization with the shaft 1 are spaced apart on the same shaft 1. And means 6, 7 for regulating the rotation of the shaft 1, by producing sliding friction based on the viscosity of the medium 7, are arranged in the driven-side rotating member 2 for holding the hysteresis member 3. As a result, it is possible to impart an approximately constant tension to the wire or the medium such as paper or tape 14 when winding or rewinding it, whereby winding or rewinding operations can be performed without any radial compression and non-uniformity being produced in the resulting winding. The gap between the hysteresis member 3 and the magnetic substance member 4 allows the level of tension imparted to the wire or the medium 14 during the winding or rewinding thereof to be adjusted.

Next, a magnetic clutch according to a second embodiment of the present invention will be described hereinafter referring to FIG. 5.

Figure 5:
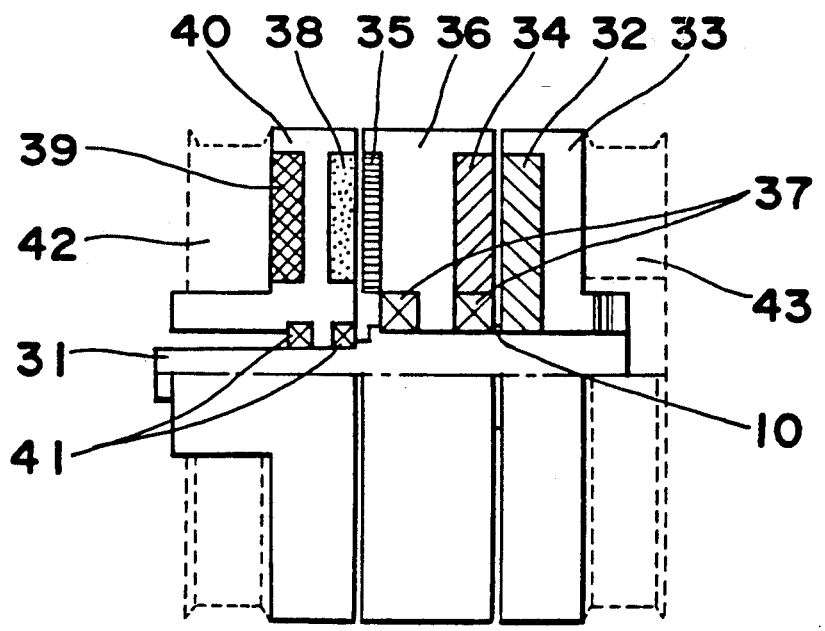
FIG. 5 is a partial cross-sectional view of a magnetic clutch according to a second embodiment of the present invention.
Figure 6:
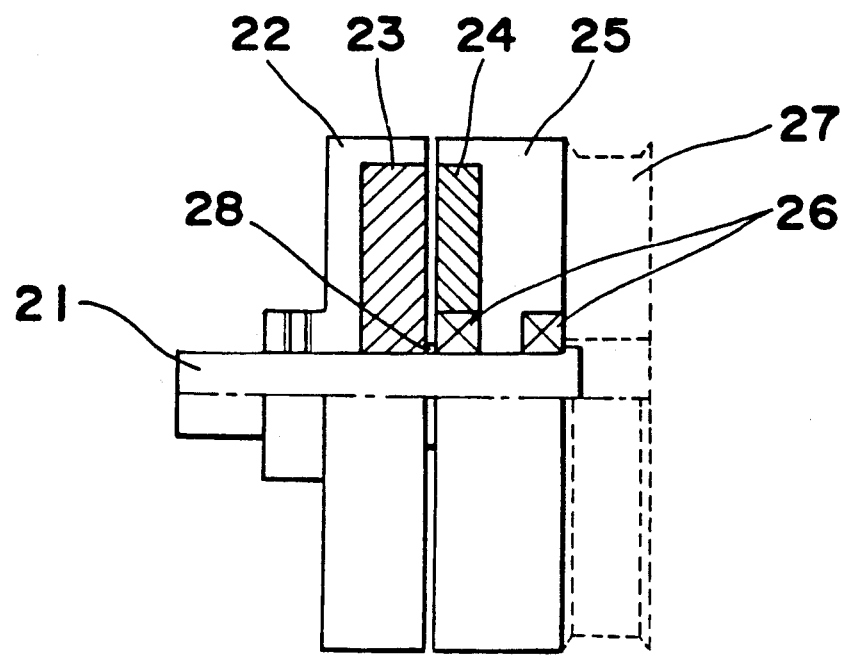
FIG. 6 is a partial cross-sectional view of a conventional magnetic clutch.
Figure 7:
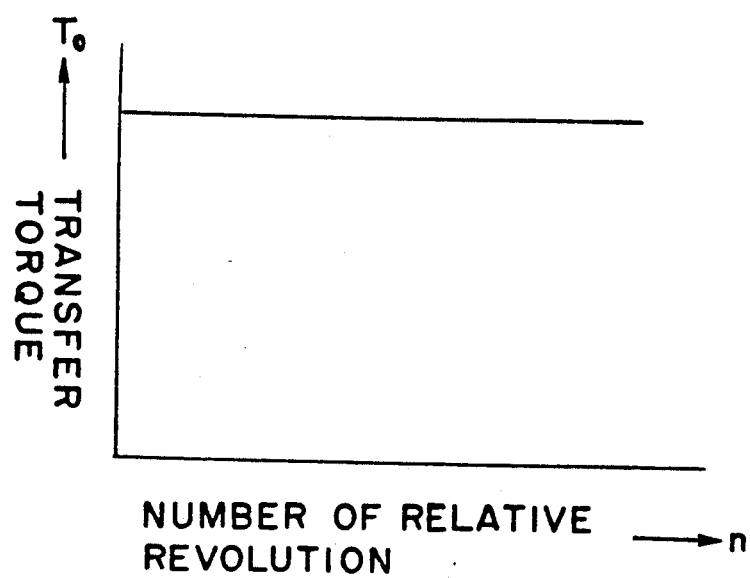
FIG. 7 is a characteristic diagram of the transfer torque of the conventional magnetic clutch.

In FIG. 5, reference numeral 31 denotes a rotary shaft, 32 a magnetic substance member, 33 a driving-side rotating member for holding the magnetic substance member 32, 34 a hysteresis member, 35 an iron plate, 36 a driven-side rotating member for holding the hysteresis member 34 and the iron plate 35 and arranged on the shaft 31 through bearings 37, 38 magnetic fluid, 39 a magnet, 40 an output-side rotating member for holding the magnetic fluid 38 and the magnet 39 and arranged on the shaft 31 through bearings 41, 42 an output-side pulley, and 43 an input-side pulley.

The operation of the magnetic clutch having the above structure will be described hereinafter.

When the rotary power from a driving source (not shown) is applied to the driving-side rotating member 33 through the input-side pulley 43, a transfer torque $T_0$ is transferred from the magnetic substance member 32 to the hysteresis member 34 as in the first embodiment. On the other hand, the magnet 39 arranged on the output-side rotating member 40 regulates the movement of the magnetic fluid 38. When the angular velocity of the output-side pulley 42 is ($\omega'$) and the coefficient of the viscosity of the magnetic fluid 38 is ($\mu'$), the torque T" ($= \mu' \cdot \omega'$) acting in a direction tending to prevent the rotation of the driven-side rotating member 36 is generated between the magnetic fluid 38 to the iron plate 35 arranged on the driven-side rotating member 36. Therefore, the transfer torque T' of the entire magnetic clutch is represented by the following equation:

$$T' = T_0 - T'' = T_0 - \mu' \cdot \omega'$$

When the winding radius is (r), the tension (S') exerted on the wire or the medium 14 is represented by the following equation:

$$S' = T'/r = (T_0 - T'')/r = T_0/r - \mu' \cdot \omega/r$$

The magnetic fluid 38 exhibiting a value ($\mu'$), corresponding to the viscosity of the magnetic fluid 38, is so selected that the difference between the tensions generated when the maximum and minimum radii of the winding occur, as shown by the solid curve line in FIG. 4, is remarkably smaller than that between the tensions generated when the maximum and minimum radii of the winding in the conventional apparatus occur, as shown by the dotted line in FIG. 4.

According to the second embodiment, the magnetic substance member 32 rotating in synchronization with the shaft 31 and the hysteresis member 34 rotating in asynchronization with the shaft 31 are spaced apart on the same shaft 31. And means 38, 39 for regulating the rotation of the driven-side rotating member 36, by producing sliding friction based on the viscosity of the fluid 38, are provided on the driven-side rotating member 36 having the hysteresis member 34 thereon. As a result, it is possible to impart an approximately constant tension to the wire or the medium such as paper or tape 14 when winding or rewinding it, whereby the winding and rewinding operations can be performed without any radial compression and non-uniformity being produced in the resulting winding. The gap between the hysteresis member 34 and the magnetic substance member 32 allows the level of tension imparted to the wire or the medium 14 during winding or rewinding to be adjusted.

Although the magnetic substance member is arranged on the driving-side rotating member and the hysteresis member is arranged on the driven-side rotating member in the first and second embodiments, conversely, the hysteresis member can be arranged on the driving-side rotating member and the magnetic substance member can be arranged on the driven-side rotating member.

According to the first and second embodiments, it is unnecessary to provide an external power source for transferring the torque, resulting in an improvement in safety and no effect of source voltage fluctuations. And since the magnetic clutch can be used for reversible rotations, the clutch is compact without any change-over switch.

Although the present invention has been fully described in connection with the preferred embodiments thereof with reference to the accompanying drawings, it is to be noted that various changes and modifications will become apparent to those skilled in the art. Such changes are modifications are to be understood as included within the scope of the present invention as defined by the appended claims unless they otherwise depart therefrom.

What is claimed is:

1. A magnetic clutch comprising:
   a rotary shaft;
   a driving-side rotating member having one of a magnetic substance member and a hysteresis member thereon, and so supported on said rotary shaft as to be rotatable in asynchronization with the rotary shaft;
   a driven-side rotating member having the other of the magnetic substance member and the hysteresis member thereon, and fixed to said rotary shaft so as to rotate in synchronization with the shaft, the driven-side and driving-side rotating members being spaced apart on said shaft with said magnetic substance member and said hysteresis member confronting one another; and
   regulating means, including a viscous medium, provided on said shaft for producing sliding friction based on the viscosity of said medium as said shaft rotates and for transmitting a force corresponding to the sliding friction to said shaft to thereby regulate the rotation of the shaft.

2. A magnetic clutch as claimed in claim 1, wherein the means for regulating the rotation of the shaft also includes a plate fixed to said shaft so as to rotate in synchronization with rotation of the shaft, the viscous medium being disposed over said plate.

3. A magnetic clutch as claimed in claim 1, and further comprising means for adjusting the spacing between the driving-side and driven-side rotating members.

4. A magnetic clutch comprising:
   a rotary shaft;
   a driving-side rotating member having one of a magnetic substance member and a hysteresis member thereon, and fixed to said rotary shaft so as to rotate in synchronization with the rotary shaft;
   a driven-side rotating member having the other of the magnetic substance member and the hysteresis member thereon, and so supported on said rotary shaft as to be rotatable in asynchronization with the shaft, the driven-side and driving-side rotating members being spaced apart on said shaft with said magnetic substance member and said hysteresis member confronting one another; and
   regulating means, including a viscous medium, provided on said driven-side rotating member for producing sliding friction based on the viscosity of said medium as the driven-side rotating member rotates and for transmitting a force corresponding to the sliding friction to said driven-side rotating member to thereby regulate the rotation of the driven-side rotating member.

5. A magnetic clutch as claimed in claim 4, wherein the means for regulating the rotation of the shaft also includes a rotating member arranged on the shaft and a magnet, and wherein said viscous medium is a magnetic fluid held on said rotating member by the magnet.

6. A magnetic clutch as claimed in claim 4, and further comprising means for adjusting the spacing between the driving-side and driven-side rotating members.

* * * * *